United States Patent [19]

Bertotto

[11] Patent Number: 4,604,310
[45] Date of Patent: Aug. 5, 1986

[54] ENDLESS BELTS FOR BATTERY PASTING MACHINES AND METHOD FOR MANUFACTURING THE SAME

[75] Inventor: Serafino Bertotto, Como, Italy

[73] Assignee: Industrie Tessili Bresciane S.P.A., Merone, Italy

[21] Appl. No.: 629,720

[22] Filed: Jul. 11, 1984

[30] Foreign Application Priority Data

Aug. 3, 1983 [IT] Italy .............................. 22412 A/83

[51] Int. Cl.⁴ .............................................. B32B 5/02
[52] U.S. Cl. ..................................... 428/36; 428/194; 428/196; 428/234; 428/247; 428/300; 428/311.1
[58] Field of Search ................. 428/194, 196, 234, 36; 427/247, 300, 311.1

[56] References Cited

U.S. PATENT DOCUMENTS 4,425,392  1/1984  Oikawa et al. ...................... 428/234
4,427,734  1/1984  Johnson .............................. 428/234

Primary Examiner—Marion C. McCamish
Attorney, Agent, or Firm—Bucknam and Archer

[57] ABSTRACT

A seamless endless belt for battery pasting machines, particularly lead batteries, consisting of an outer endless woven fabric formed by 1 to 3 plies and an inner backing layer formed by multi-strata of non-woven webs, consisting of synthetic staple fibres and of light woven meshes; the outer woven fabric and the inner backing layer being bound together by needling.

14 Claims, 6 Drawing Figures

Cut lines

ENDLESS BELTS FOR BATTERY PASTING MACHINES AND METHOD FOR MANUFACTURING THE SAME

BACKGROUND OF THE INVENTION

1. Field of the Invention

The present invention relates to endless belts for battery pasting machines and to a method for manufacturing the same.

More particularly, the present invention relates to endless belts for pasting machines of electric lead battery plates.

2. Description of the Prior-art

In the industry of the electric lead batteries, the plates are produced by pasting an active material formed by a mixture of lead-oxide and bonding agents inside thin lead-alloy frames, called grids.

The grids are carried under the pasting machine hopper by a conveyor belt which is supported by a steady steel plate. The active material coming out from the hopper is pressed into the running grids by means of pressure rolls and uniformly distributed so that the pasted grids have a constant thickness.

For this purpose it is necessary that the belt facilitates the active material distribution inside the grid holes so that the lead-oxide material can stick accurately to the grid frames.

The ratio between the quantity of water inside the belt and that inside the active material has a great importance in order to create thin water films with lubricating purposes.

Heavy cotton belts are generally used as the most convenient grid conveying system.

Generally these cotton belts are woven 6-ply open-ended bands transformed into endless rings by joining the two band ends and seaming them together.

In order to guarantee the belt mechanical strength and to avoid elongations as well as a fast surface wearing, the band is woven with strong cotton yarns, for example count 700 to 900 decitex, strands 4 to 8 and 1.5 to 2.5 twists per cm.

The band weaving takes place with heavy shuttle looms equipped with 12 head shafts and 2 warp beams.

This band has a thickness of 6–7 mm. and a weight of about 4000/5000 gms/m$^2$. Because of their remarkable thickness and their great number of length-wise and cross-wise yarns, these belts cannot be endlessly woven in the loom.

Therefore to get a ring-shaped belt from the band it is necessary to sew the two band ends after cutting it at the right length.

The seam is the most delicate and weak zone of these belts.

Since the seam zone must have the same thickness as the rest of the belt, the two band ends are sharpened in their thickness at decreasing sections so as to form a narrow angle over a rather wide area.

The two sharpened ends are put one upon the other and joined together by means of a suitable glue and are then sewn together to increase the stretching resistance of this zone.

Even though the thickness is constant throughout the entire belt, the seam area has a stiffness which is somehow different from the other points of the belt and its extensibility is far from being equal to the rest of the belt, thus creating some drawbacks.

One of these drawbacks is that, because of their cotton-yarn construction, the belt cannot be conveniently heat-set. The result is a lack of dimensional stability during the operation on the pasting machines.

The cotton belts, which are wetted during operation, tend to lengthen beyond the machine maximum stretching gauge, slipping around the driven and guide rolls of the pasting machine. Moreover, the seam or splice represents the weak point of the belt because both of the tension applied to it during working and the friction due to pasting machine pressure rolls and of the abrasion of the active material used for grid filling. The thin threads usually used for the belt seam are cut and the seam loses its strength. Another drawback of the known belts is that the joining of the two ends is rarely made at right-angle and therefore, the resulting belt is not perfectly cylindrical, but conical.

Conical belts tend to slip during operation from one side of the machine to the other or to move always towards the same machine side with damage for the belt edges.

Usually the belt edge wearing is the beginning of the seam break-up.

A further drawback of the known belts is that, because of the gluing agents, the water absorption in the seam area is different (lower) from the rest of the belt; consequently the distribution of the active material onto the grids is not uniform throughout the belt. Moreover, the belt thickness in the seam area is not equal to the rest of the belt; so that an irregular pasting occurs.

SUMMARY OF THE INVENTION

The object of the present invention is to remedy the above mentioned drawbacks of the known belts.

According to the present invention this and other objects are achieved by an endless seamless belt consisting of two layers: an outer thinner layer formed by 1 to 3 plies of woven fabrics made of cotton or other thread, and an inner backing layer applied to the former layer and formed by multi-strata of non-woven webs made of synthetic staple fibres and light synthetic woven meshes; the two layers being bonded together by means of needling (needle punching).

The thickness of the outer layer depends on the possibility of weaving an endless fabric perfectly regular and uniform in all its points.

The inner backing layer, which is firmly bound with the outer layer by needling, facilitates the water absorption and the water drainage thus giving a constant and uniform pasting.

BRIEF DESCRIPTION OF THE DRAWING

The belt, subject matter of the present invention, and its manufacturing method are described hereinbelow in full details with reference to the drawings which illustrate some embodiments of the present invention, and in which.

DESCRIPTION OF THE PREFERRED EMBODIMENTS

According to the present invention, the belts are always manufactured endlessly without seam or splice whatsoever, using as the outer layer an endless fabric woven by means of looms.

The fabric for the outer layer are made of cotton and/or synthetic fibres according to the characteristics of absorption and wear-resistance requested by battery plate production.

The belts of the present invention have a multi-structure and comprise two layers:

(a) An outer layer which goes in contact with the battery plates and it is formed by a one/two/three ply endless fabric woven by means of a heavy shuttle-loom. Assuming by example that the finished belt must have a length of 100 inches, the outer fabric will be woven 50 inches wide by the loom.

To produce this fabric, threads of cotton can be used (e.g. English cotton count Ne 7/5 or Ne 10/10) or synthetic carded threads of polyester and/or polyamide fibres (e.g. metric count Nm 8.3/6).

The number of warp and weft threads may be varied according to requested compactness and firmness of the fabric. The "wrinkled" surface of the fabric has an influence on the active material distribution.

Figure 1:
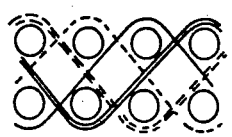
FIG. 1 is a cross-section of the outer endless woven fabric in its two-ply embodiment.
Figure 2:
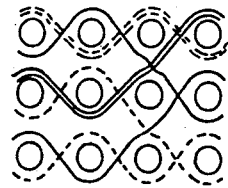
FIG. 2 is a cross-section of the outer endless woven fabric in its three-ply embodiment.

The woven fabric in its two or three ply embodiment is shown respectively in FIGS. 1 and 2, wherein the interweaving of warp and weft threads of the different plies is clearly shown.

Figure 6:
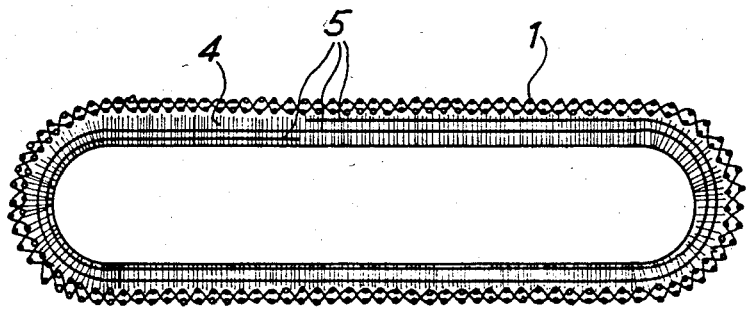
FIG. 6 is a complete cross-section of a belt ready-to-use.

(b) The inner backing layer consists of non-woven webs of synthetic staples inserted into the outer layer (a) by means of needling or needling punching. (FIG. 6).

The synthetic staples (4) may be polyester or polyamide fibres, having, for example, a count of 6 to 17 decitex and a staple length of 120 to 150 mm. Light synthetic woven meshes are placed between layer (a) and (b), acting as a support base in order to increase the belt stretching and crushing resistance.

These light meshes which have a weight of 150 to 200 g/m$^2$n may be manufactured by high tenacity polyester multifilament yarns, having, for example, a count of 1000 to 1500 dtex.

The meshes may have 8 to 12 yarns per cm. in warp and the same number of yarns in weft.

The high breaking load and the low elongation percentage of these meshes keep the belt dimensionally stable during their working, avoiding slippings and side-to-side movements which are the cause of early belt destruction.

The non-woven webs and the light meshes are wrapped around the woven fabric described under (a) with a different number of turns depending on the thickness and strength the manufacturer wants to get.

The wrapping start-point has to coincide with the wrapping end-point in order to avoid differences in belt thickness due to overlappings forming a "step".

All these webs and meshes are bound together and with the endless woven fabric by means of a needling operation or needle punching.

The needles of the needling machine (locker), which may be barbed needles, insert the fibres vertically through the belt thickness, thus binding all the layers between them.

Figure 3:
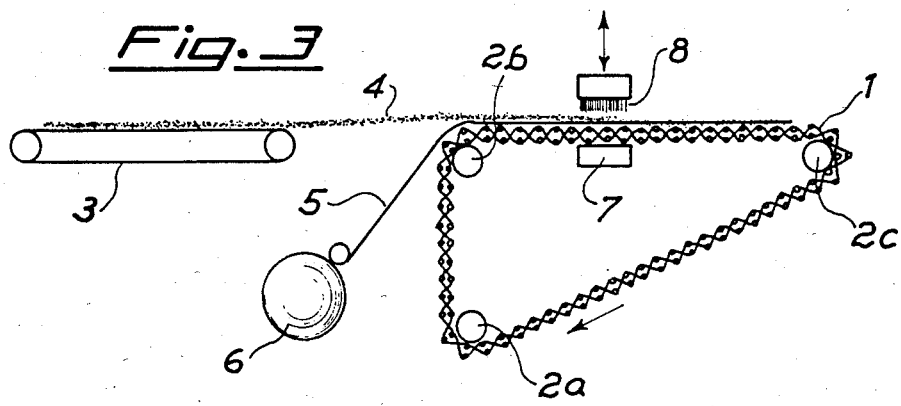
FIG. 3 is a schematic side view of the needling apparatus for the application of non-woven webs and light synthetic meshes on the endless woven fabric.

The needling operation is sketched in FIG. 3 which shows the endless multi-ply fabric (1) driven and kept under tension by rolls 2a, 2b, and 2c.

By means of a conveyor, the synthetic web (4), formed by the cross-lapper (3), is carried applied. The light meshes (5) coming from the roll (6) are deposited on the endless fabric (1) between layer (1) and (4).

When the web (4) and the mesh (5) pass together with the endless fabric (1) on the plate (7) under the needles (8) of the needling machine, the repeated up-and-down needles motion inserts the web synthetic fibres into the endless fabric, forcing them to the opposite side, thus binding all the strata together and creating dewatering channels through the strata themselves for the out-flow of the liquid contained in the active material.

Figure 5:
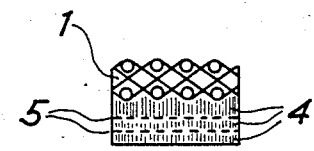
FIG. 5 is a portion of the cross section of a finished belt with a two-ply outer fabric.

By the end of the needling operation, the multi-strata belt is taken out of the needling machine and turned inside out so that the layer (a) becomes the outer part of the belt in its working conditions. The needling machine is preferably equipped with a cantilevered beam hinged on one side thereof. In FIG. 5, numeral 11 is the 2-ply outer fabric. Numeral 12 designates the non-woven fabric. Numeral 13 designates the light synthetic meshes.

Figure 4:
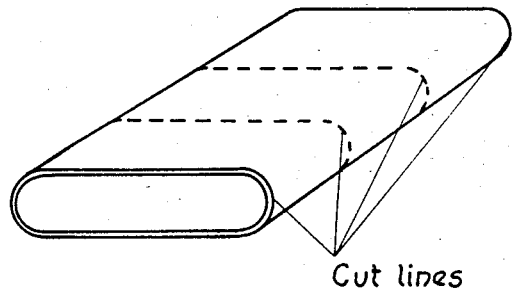
FIG. 4 is a schematic and perspective view of the endless tube or sleeve ready to cut weft-wise to get belts as wide as the battery pasting machines.

Generally, for economic reasons, the seamless belts are not manufactured with the same width of the battery pasting machines on which they have to work, but each tube or sleeve is as wide as the needling machine so that from the same sleeve more belts can come out by cutting the sleeve in as many rings as possible according to the pasting machine widths they have to serve (see FIG. 4).

The belts are then heat-stabilized or heat-set under tension in a heat-setting calender machine equipped with cantilevered cylinders heated at a temperature of 150°-200° C.

One cylinder can move back and forward acting as a stretching roll. The calender machine has a high precision automatic device for checking the cylinders parallelism.

During this operation a chemical treatment can be carried out. The main object of this treatment, which can be made for example with epoxy or acrylic resins or with surface active agents, is to improve belt compactness and dewatering ability.

The belt edges are melted by means of a soldering iron and/or reinforced with hardening resins in order to avoid edge fraying. Trials have shown that in order to get a belt uniform thickness throughout its whole length it is advisable to let the belt run against a grinding cylinder rotating at a high speed so that the exceeding thickness is easily removed.

What I claim is:

1. A seamless endless conveyor belt for battery pasting machine which comprises two layers
    (a) an outer layer formed by between 1 and 3 plies of an endless woven fabrics, and
    (b) an inner backing layer formed by multi-strata of non-woven webs made of synthetic staple fibres and light woven meshes, said belt being prepared by inserting said light woven meshes between said outer layer and said non-woven webs and bonding said two layers by needling whereby the outer layer and the inner layer are bounded together and dewatering channels are formed therethrough to let liquid flow out.

2. A seamless endless belt according to claim 1, wherein the outer layer is made of cotton threads.

3. A seamless endless belt according to claim 1, wherein the outer layer is made of synthetic carded threads of polyester or polyamide fibres.

4. A seamless endless belt according to claim 1, wherein the non-woven webs are made of synthetic staple fibres.

5. A seamless endless belt according to claim 1, wherein the light woven meshes are made of high tenacity polyester multifilament yarns.

6. A seamless endless belt according to claim 1, wherein the belt has edges and the edges are melted.

7. A seamless endless belt according to claim 6, wherein the edges are reinforced with hardening resins.

8. A seamless endless belt according to claim 1, wherein the edges are reinforced with hardening resins.

9. A method for manufacturing a seamless endless belt for a battery pasting machine comprising the steps of:
   (a) weaving an outer endless fabric (1) consisting of between 1 and 3 plies with a circular loom;
   (b) forming a layer (4) of non-woven webs of synthetic staple fibres;
   (c) forming a layer (5) of light synthetic meshes;
   (d) feeding said layer (5) and said layer (4) onto said endless fabric (1) and inserting said layer (5) between said layers (4) and said endless fabric (1);
   (e) binding the outer endless fabric (1) together with the layers (4) and (5) and by fibres linking through a needling operation to obtain a multilayer seamless belt having dewatering channels;
   (e) turning said multilayer belt inside out;
   (f) and cutting the seamless belt in ring-shaped belts each having a width corresponding to the width of the pasting machine.

10. A method according to claim 9, wherein the seamless endless belts are heat-set under tension, and at a temperature comprised between 150° and 200° C.

11. A method according to claim 10, wherein the seamless endless belts, while being heat-set, are treated with a substance which is a member selected from the group consisting of an epoxy resin, an acrylic resin, a surface active agent and mixture thereof.

12. A method according to claim 9, wherein the edges of the seamless endless belts are reinforced by melting the synthetic fibres or by impregnation with hardening resins.

13. A method according to claim 9, wherein the edges of the seamless endless belts are reinforced by impregnation with a hardening resins.

14. The method according to claim 9 wherein said inner layer (b) is wrapped around the endless fabric weaved in step (a) and the wrapping start point coincides with the wrapping end point whereby differences in belt thickness are avoided.

* * * * *